United States Patent

[11] 3,561,491

| [72] | Inventor | Robert McFedries Jr. |
| | | Bay Village, Ohio |
| [21] | Appl. No. | 723,196 |
| [22] | Filed | Apr. 22, 1968 |
| [45] | Patented | Feb. 9, 1971 |
| [73] | Assignee | The Dow Chemical Company |
| | | Midland, Mich. |
| | | a corporation of Delaware |

[54] CONFIGURATION FOR NONSLIP PLASTIC BAG MATERIAL
6 Claims, 2 Drawing Figs.

[52] U.S. Cl. ................................................. 138/118,
138/104, 138/141, 138/177
[51] Int. Cl. .................................................. F16l 11/04
[50] Field of Search .......................................... 138/104,
118, 140, 141, 177, 178, 124, 125, 145, (Cursory)

[56] References Cited
UNITED STATES PATENTS
1,902,573  3/1933  Neidick ........................ 138/177X

| 2,099,126 | 11/1937 | Larsen...................... | 138/104X |
| 2,331,974 | 10/1943 | Haff......................... | 138/118X |
| 2,407,549 | 9/1946  | Gurruick.................. | 138/104X |
| 3,056,428 | 10/1962 | Brown...................... | 138/118  |
| 3,070,132 | 12/1962 | Sheridan.................. | 138/118  |
| 3,321,804 | 5/1967  | Breidt...................... | 138/104X |
| 3,407,171 | 10/1968 | Segre....................... | 138/118X |
| 3,343,568 | 9/1967  | Branscum................. | 138/178  |

FOREIGN PATENTS
1,384,400  11/1964  France ........................ 138/178

Primary Examiner—Herbert F. Ross
Attorneys—Griswold and Burdick, Richard G. Waterman and Sidney J. Walker ABSTRACT: An improved plastic shipping container of baglike configuration having adhering to one surface a nonskid material positioned at selected intervals so as to avoid "blocking" on the roll during manufacturing operations.

PATENTED FEB 9 1971   3,561,491

INVENTOR.
Robert M. Fedries, Jr.
BY
Sidney J. Walker
ATTORNEY

CONFIGURATION FOR NONSLIP PLASTIC BAG MATERIAL

This invention relates to composite plastic tubular material for the manufacture of nonslip bags and the like, and more particularly, the presence of a nonskid material uniquely positioned in substantially parallel striations so positioned as to present undesirable blocking of the film stock while in roll form.

In U.S. Pat. No. 3,396,901 I have disclosed and claimed a synthetic resinous package or bag which has an essential and critical feature, a surface layer of chlorinated polyethylene or other adhesion promoting resinous material and an inner layer of a nonblocking polyolefin resin. The external surface of this package or bag has a slip angle of at least 50° and is particularly advantageous in that shifting of the bags relative to one another is generally eliminated in handling operations. As indicated in that application, many products, particularly those of a granular and powdery nature, are advantageously shipped in bags, for example, synthetic resins both in pellet and powder form, flour, sugar, talc, fertilizer and the like. Usually such bags contain from 50—100 pounds of package material. Considerable difficulty is encountered in many instances wherein bags must be stacked one upon the other where such bags have been prepared from a synthetic resinous composition. Various multiwall paper structures having a creped outer finish provide an adequate coefficient of friction to permit stacking of bags one on top of another on a pallet and subsequent handling of such a stacked pallet by means of a fork truck or crane or like loading device. However, employing the advantageous embodiment of a plastic or synthetic resinous bag, oftentimes the coefficient of friction of the material from which the bag is prepared is insufficient to permit advantageous stacking and shipping without undesired motion of the stacked bags relative to one another.

Such a bag as described has, in its finished form, performed with eminent satisfaction; however, manufacture of such a bag has introduced certain problems. In the manufacture of such a bag, "blocking" of the stock while in roll form is often a problem. Moreover, material costs of such a two-ply bag can be quite high.

It is an object of this invention to create a bag which has nonskid qualities but still is nonblocking while in roll form to provide ease of manufacture and handling.

It is a further object of this invention to provide a unique nonskid bag by the application of nonskid material in strategic, selected portions of the tubular stock.

It is a further object of this invention to provide a bag having nonskid areas which are segmented thereby making such a bag more economic, and at the same time, having sufficient nonskid qualities.

Further features and other advantages of the present invention will become more apparent from the following specification when taken in connection with the drawings wherein.

Figure 1:
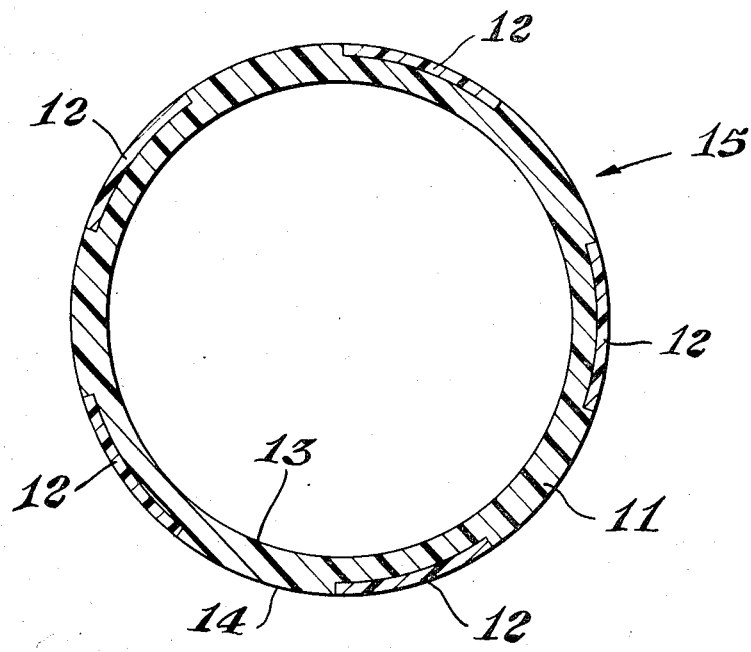
FIG. 1 is a schematic representation of a greatly enlarged end view of a portion of film stock employed in manufacturing bags in accordance with the invention.

Looking now with more particularity at FIG. 1, there is illustrated an end view of a film in accordance with the present invention generally designated by the reference numeral 15. The film 15 is a composite tubular structure, comprising a film body 11, having a first major surface 13 and a second major surface 14, the surfaces 13 and 14 being generally concentric, the spacing between the surfaces being greatly exaggerated for purposes of illustration. A plurality of spaced substantially parallel narrow elongate strips 12 are disposed within the film body 11 and have a surface which is substantially coplanar with the surface 14 and serve to define a portion thereof. As shown, each strip 12 occupies about one-tenth of the circumference of the outer surface 14 of the tubular film 15. Strips 12 are more or less equally spaced, consequently the five strips 12 shown in FIG. 1 occupy approximately 50 percent of the circumference of outer surface 14.

Figure 2:
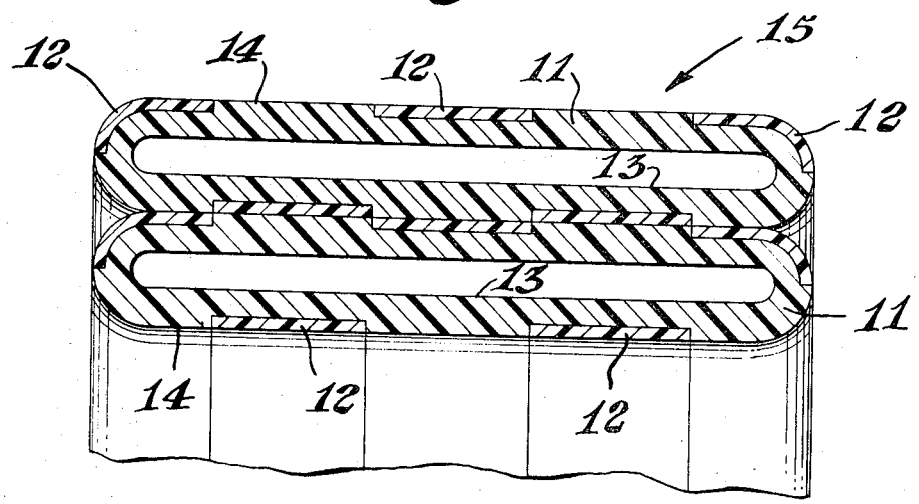
FIG. 2 is a schematic representation of an end view of a portion of the stock while in roll form in accordance with the invention.

Looking at FIG. 2 it is seen that the material when in roll form will not block because the nonskid surfaces 12 are not in contact with each other or at the most only in partial contact with nonskid material on the adjacent surface.

The method of making such striations of nonskid material on the outer surface of the tubular film is known in the art and does not form a part of the invention herein. A preferred method of making such striations in tubular material wherein the striations are generally coplanar with the body of the film material is disclosed in U.S. Pat. application 509,731 filed Nov. 26, 1965 in the name of Lloyd E. LeFevre and John R. Frost. This preferred method includes two extruders. The primary extruder is equipped with a die connected to it by means of a gooseneck adapter modified to accept feed from the second extruder. The modification of the gooseneck adapter includes a series of tubes which direct the melt of the nonskid material from the second extruder to desired locations in the die while at the same time blocking or partially blocking the flow or primary film melt at those points.

The primary material 11 in the tube stock comprises preferably a nonblocking polyolefin resin selected from the group consisting of ethylene polymers, propylene polymers and resinous copolymers of ethylene and propylene. The nonskid material 12 comprises a synthetic resinous material having a slip angle of at least 50°, the slip angle being determined by stretching a sheet of material to be evaluated on a flat surface, securing the material to the surface, overwrapping a block weighing 1 pound and having a rectangular face measuring 2 by 2" with another portion of material to be tested, placing the covered 2 by 2" surface of the block in engagement with a portion of the film secured to the flat surface, subsequently raising one end of the flat surface to cause the surface of the block to assume an increase in angle with respect to the horizontal and determining the angle of the flat surface to the horizontal at the time when the block commences to slide or move.

Materials which are eminently suited for the nonskid striations of such bags or bodies are polyethylene, chlorinated polyethylene, ethylene-vinyl acetate copolymers, ethyleneethyl acrylate copolymers, ethylene acrylic acid copolymers including graft copolymers, certain plasticized polyvinyl chlorides as well as many other extrudable synthetic resinous compositions. When polyethylene is employed for the outer surfaces, it must be without the slip additives which are customarily added to polyethylene formulations sold for extrusion into filament.

Particularly advantageous and beneficial for the preparation of such nonskid material as is used in the preparation of bags in accordance with the present invention is polymeric material obtained by chlorination of essentially linear finely divided polyethylene or interpolymers containing at least about 90 mole percent of ethylene in the polymer molecule, which polymers have a molecular weight of less than about 1,000,000 and preferably between 20,000 and 300,000.

More specifically, the preferred chlorinated olefin polymers utilized contain from about 25 and 50, and preferably between about 30 and 40 weight percent of chemically combined chlorine. Particularly preferred chlorinated olefin polymers are those prepared by chlorination in aqueous suspension, which are further characterized by having a relative crystallinity of between 15 and 28 percent when containing about 25 weight percent chlorine, and a relative crystallinity of less than about 10 percent when containing about 34 weight percent of chemically combined chlorine. Such preferred chlorinated polyolefins are readily obtained by practice of a chlorination procedure which comprehends the suspension chlorination in an inert medium of finely divided polymers and interpolymers of ethylene to a desired total of combined chlorine content, wherein such polyolefin is first chlorinated at a temperature of up to about 110° C., and preferably between 65° C. and 110° C., for a period sufficient to provide a chlorine content of not more than about 23 weight percent chlorine, based on the total weight of the polymer; followed by the sequential suspension chlorination of such polymer, in a substantially noncrystalline, particulate form, at a temperature above that employed for the herein described first chlorination and not more than about 150° C., for a period sufficient to provide a combined chlorine content of between 25 and 50 weight percent, based on the total weight of the polymer.

Preferably, the polyolefinic materials to be chlorinated are those distinct species and varieties of essentially linear and nonbranched, highly porous, finely divided polymers containing at least about 90 mole percent ethylene in the polymer molecule, with any remainder being one or more ethylenically unsaturated comonomers. Exemplary of such comonomers are the nonaromatic hydrocarbon olefins having three or more carbon atoms such as propylene, butene-1 and butene-2, and 1,7-octadiene and the like, cyclooctadiene and the like; substituted olefins such as acrylic acid and its esters; conjugated diolefins such as butadiene and the like; and the alkenyl aromatic compounds such as styrene and its derivatives, among many other polymerizable materials known to the art.

Advantageously, the polymers and interpolymers described herein are prepared under the influence of catalyst systems comprising admixtures of strong reducing agents such as triethyl aluminum and compounds of groups IV-B, V-B, and VI-B metals of the Periodic system, such as titanium tetrachloride, and the like, and are characterized by having molecular weights below about 1,000,000 and preferably from about 20,000 to 300,000. It is to be pointed out, however, that conventionally prepared, lowdensity branched polyolefins may also be advantageously chlorinated by the process of the present invention, providing such materials are available in finely comminuted form.

It is further to be pointed out that other ingredients such as pigments, stabilizers, lubricants and the like may be incorporated in the chlorinated olefin polymers, if desired.

Exemplary of particularly useful stabilizers are those materials conventionally employed in the preparation of vinyl polymer and copolymer film compositions, e.g., organic complexes and/or salts of lead, barium, cadmium, zinc, sodium, etc., and particularly the sulfur containing organo tin compounds including the alkyl tin mercaptides as well as dibutyl tin maleate among others.

Advantageously, tubular material is prepared in accordance with the present invention having a thickness of 10 mils. Five striations of nonskid material of substantial equal width and equally spaced comprising a total surface circumferentially of about 50 percent of the outer surface of the primary material is continuously extruded upon and into the primary sheet tube. This nonskid material is comprised of chlorinated polyethylene containing 30 weight percent chlorine. The thickness of these chlorinated polyethylene striations is 3 mils. The tubular material comprises of low density polyethylene having a melt index of 0.45 and a density of 0.916 and is about 7 mils thick. The finished tube stock is continually wound upon a roll. Because of the interdigitated spacing of the nonskid material no blocking occurs on the roll as shown in FIG. 2. Bags formed of this material are filled with 50 pounds of pelletized calcium chloride and sealed. The bags are stacked on a pallet and moved about. The nonskid characteristics of the bags are found to be eminently satisfactory.

Chlorinated polyethylene as used in the striations has a cost per pound which is considerably higher than that of the polyethylene used in the main body of the tube stock. Consequently, striating such chlorinated polyethylene throughout the bags results in good economies.

The invention is not restricted to a combination of five spaced nonskid striations, but encompasses those combinations of spaced, roughly parallel striations of varying widths which are interdigitated as shown in FIG. 2 so that they do not contact each other substantially in adjacent portions of the tube stock when wound on a roll, such combinations providing sufficient nonskid area overall to produce the desired nonskid characteristics in the finished bags.

As is apparent from the foregoing specification, the present invention is susceptible of being embodied with various alterations and modifications which may differ particularly from those that have been described in the preceding specification. For this reason, it is to be fully understood that all of the foregoing is intended to be merely illustrative and is not to be construed or interpreted as being restrictive or otherwise limiting of the present invention, except as is set forth and defined in the appended claims.

I claim:

1. A roll of collapsed tubular synthetic resinous film, said film comprising an inner surface and a concentric outer surface, said film comprising a nonblocking polyolefin resin selected from the group consisting of ethylene polymers, propylene polymers and resinous copolymers of ethylene and propylene, said outer surface having thereon an adhesive synthetic resinous material having adhesion characteristics substantially greater than the film itself, said adhesive synthetic resinous material defining a plurality of generally parallel spaced elongate strips, said strips running the length of said outer surface, the said strips being interdigitated with one another so that in the collapsed condition the strips in the adjacent surfaces are noncontacting one to the other on adjacent parts of said roll.

2. The roll of tubular film of claim 1 wherein said elongate strips are embedded within said outer surface and define at least one surface generally coplanar with said outer surface, said strips comprising at least 50 percent of the area of said outer surface.

3. The roll of tubular film of claim 1 wherein the film is polyethylene.

4. The roll of tubular film of claim 3 wherein the elongate strips comprise a chlorinated polyolefin.

5. The roll of tubular film of claim 1 wherein the elongate strips comprise a polymer of a major portion of ethylene and a minor portion of vinyl acetate.

6. The roll of tubular film of claim 1 being unrolled and separated into bag length segments, with each of said segments being sealed across at least one of its ends to form a nonskid shipping bag.